United States Patent [19]
Smith

[11] 3,889,104
[45] June 10, 1975

[54] ALTITUDE DIGITIZER

[75] Inventor: Philip L. Smith, Richmond, Va.

[73] Assignee: Aero Industries, Inc., Sandston, Va.

[22] Filed: Apr. 8, 1974

[21] Appl. No.: 459,206

[52] U.S. Cl............ 235/150.2; 73/398 C; 324/79 D; 340/27 NA; 340/206; 340/347 DD
[51] Int. Cl.......................... G01l 9/12; H03k 13/24
[58] Field of Search......... 235/150.2, 151.3, 150.27, 235/92 CA; 340/347, 203–206, 27, 198; 314/78 D, 79 D, 99 D, 132; 328/143, 144; 73/398 C, 384

[56] References Cited
UNITED STATES PATENTS

| | | | |
|---|---|---|---|
| 3,422,324 | 1/1969 | Webb (Harrison)............... | 73/398 C |
| 3,560,959 | 2/1971 | Bergey.......................... | 340/347 DD |
| 3,572,319 | 3/1971 | Bittner et al...................... | 73/398 C |
| 3,626,748 | 12/1971 | Springer.............................. | 73/384 |
| 3,737,885 | 6/1973 | Hedrick............................ | 340/198 |
| 3,750,474 | 8/1973 | Pollack.............................. | 73/398 R |
| 3,824,378 | 7/1974 | Johnson et al................. | 235/92 CA |
| 3,839,626 | 10/1974 | Klem et al....................... | 235/151.3 |

Primary Examiner—Felix D. Gruber
Attorney, Agent, or Firm—Cushman, Darby & Cushman

[57] ABSTRACT

Apparatus for providing a digital signal for an aircraft transponder indicating aircraft altitude with a unique sensor forming part of an oscillator, a counter which accumulates counts from the sensor during a predetermined gating period, a ROM which is addressed during a further gating period to apply a sequence of digital numbers to a comparator. The address indicating one thousand foot increments a second counter which receives pulses from the sensor together with the first counter after the comparator indicates the ROM number exceeds the first counter number so that the number in the second counter indicates one hundred foot and 10 foot increments when the comparator indicates the first counter number equals the ROM output to the comparator and gating for applying the outputs of the second counter and ROM address to the transponder for transmission. In one embodiment structure for providing barometric correction is included.

13 Claims, 9 Drawing Figures

| L_SB ADDRESS | ADDRESS | REPLY CODE | | | | | | CAL. ALTITUDE X1000 FT. |
|---|---|---|---|---|---|---|---|---|
| | | A1 | A2 | A4 | B1 | B2 | B4 | |
| 00000 | 0 | 0 | 0 | 0 | 0 | 0 | 0 | ZERO ROM ALL 0 |
| 00001 | 1 | 1 | 0 | 0 | 0 | 1 | 0 | 28.750 |
| 00010 | 2 | 1 | 0 | 0 | 1 | 1 | 1 | 27.750 |
| 00011 | 3 | 1 | 0 | 0 | 1 | 0 | 0 | 26.750 |
| 00100 | 4 | 1 | 0 | 1 | 1 | 0 | 0 | 25.750 |
| 00101 | 5 | 1 | 0 | 1 | 1 | 1 | 0 | 24.750 |
| 00110 | 6 | 1 | 0 | 1 | 0 | 1 | 1 | 23.750 |
| 00111 | 7 | 1 | 0 | 1 | 0 | 0 | 0 | 22.750 |
| 01000 | 8 | 1 | 1 | 1 | 0 | 0 | 1 | 21.750 |
| 01001 | 9 | 1 | 1 | 1 | 0 | 1 | 0 | 20.750 |
| 01010 | 10 | 1 | 1 | 1 | 1 | 1 | 1 | 19.750 |
| 01011 | 11 | 1 | 1 | 1 | 1 | 0 | 0 | 18.750 |
| 01100 | 12 | 1 | 1 | 0 | 1 | 0 | 1 | 17.750 |
| 01101 | 13 | 1 | 1 | 0 | 1 | 1 | 0 | 16.750 |
| 01110 | 14 | 1 | 1 | 0 | 0 | 1 | 1 | 15.750 |
| 01111 | 15 | 1 | 1 | 0 | 0 | 0 | 0 | 14.750 |
| 10000 | 16 | 0 | 1 | 0 | 0 | 0 | 1 | 13.750 |
| 10001 | 17 | 0 | 1 | 0 | 0 | 1 | 0 | 12.750 |
| 10010 | 18 | 0 | 1 | 0 | 1 | 1 | 1 | 11.750 |
| 10011 | 19 | 0 | 1 | 0 | 1 | 0 | 0 | 10.750 |
| 10100 | 20 | 0 | 1 | 1 | 1 | 0 | 1 | 9.750 |
| 10101 | 21 | 0 | 1 | 1 | 1 | 1 | 0 | 8.750 |
| 10110 | 22 | 0 | 1 | 1 | 0 | 1 | 1 | 7.750 |
| 10111 | 23 | 0 | 1 | 1 | 0 | 0 | 0 | 6.750 |
| 11000 | 24 | 0 | 0 | 1 | 0 | 0 | 1 | 5.750 |
| 11001 | 25 | 0 | 0 | 1 | 0 | 1 | 0 | 4.750 |
| 11010 | 26 | 0 | 0 | 1 | 1 | 1 | 1 | 3.750 |
| 11011 | 27 | 0 | 0 | 1 | 1 | 0 | 0 | 2.750 |
| 11100 | 28 | 0 | 0 | 0 | 0 | 0 | 1 | 1.750 |
| 11101 | 29 | 0 | 0 | 0 | 1 | 1 | 0 | .750 |
| 11110 | 30 | 0 | 0 | 0 | 0 | 1 | 1 | −.250 |
| 11111 | 31 | 0 | 0 | 0 | 0 | 0 | 0 | −1.250 |

ALTITUDE DIGITIZER

BRIEF DESCRIPTION OF THE PRIOR ART AND SUMMARY OF THE INVENTION

The invention relates to an apparatus for providing a digital signal for an aircraft transponder indicating the altitude of the aircraft and to a sensor for providing a frequency modulated signal indicating that altitude.

All aircraft today, both small and large, must have an altimeter which provides a display to the pilot of aircraft altitude. Usually, such altimeters are mechanical in nature so that they will continue to function even under catastrophic loss of an aircraft electrical power.

With increasing numbers of aircraft in the sky, it has become more and more important for personnel and computers on the ground to be continuously aware of the positions of all aircraft aloft to minimize collisions. Most, if not all, aircraft are already provided with a transponder which is designed to receive a digital input and transmit a radio frequency signal from the aircraft to a ground location. For large aircraft, this transponder transmits a wealth of information regarding the aircraft position and condition, including altitude. However, particularly for small aircraft, it has hitherto not been the practice to provide information to the ground on altitude. Transmitting a signal to the ground which indicates the altitude of the aircraft is not only desirable but is becoming a requirement for all aircraft, both large and small, to effectively fly within the United States.

The present invention relates to a simple and unique circuit for receiving an input signal indicating the altitude of an aircraft and providing a digital output to a conventional transponder, such as the kind already found on small aircraft or the like, for transmission to a ground location. In one of the embodiments described in detail below, a gating circuit operated by a clock oscillator alternately gates on and off a circuit for coupling a pulse train from a sensor, the frequency of which indicates aircraft altitude, to a binary counter which accumulates a number accordingly within a given gating period which indicates altitude. After the binary counter has accumulated a count indicating altitude, the further signals from the sensor are blocked, and an address counter is incremented by the clock oscillator to provide a sequence of addresses to a programmed ROM with each address in the ROM providing a digital signal associated with a thousand foot increment of altitude.

The stored numbers in the ROM are applied to a comparator circuit together with the output of the binary counter storing the signals from the sensor. When the ROM number exceeds the count in the binary counter, then the gating circuit is again actuated so that the binary counter receives additional counts from the sensor. Those counts from the sensor are also applied to a further counter which accumulates a count indicating the number of 100 foot, and 10 ft. increments between the number of the ROM and the number stored in the binary counter.

When the two numbers match exactly, the two counter circuits are disabled and the output of the 100 foot and 10 ft. increment counters and the address of the ROM applied to a decoding circuit to apply a digital signal to the aircraft transponder indicating the altitude of the aircraft to the nearest 100 foot and providing 10 foot Resolution Display capabilities. By using this particular technique for providing one hundred foot increments, the needed capacity of the ROM is greatly reduced by at least a factor of ten and accordingly the expense of the apparatus is also substantially reduced.

If desired, the signal thus generated indicating aircraft altitude can be used to produce a very accurate, reliable display within the aircraft which is corrected for barometric pressure. According to a further aspect of this invention, the barometric pressure as displayed on a separate instrument within the aircraft is manually entered by switches into a further ROM which converts the entered data into 10 foot altitude correction increments. The digital output signal indicating uncorrected altitude is converted into a pulse train and stored in a counter which is incremented or decremented as a function of the output of the further ROM.

Also as discussed in detail below, the circuit includes two unique sensor assemblies for providing an analog signal indicating altitude. According to a first embodiment, the sensor includes an evacuated bellows which mounts a non-linearly, tapered piston for movement along a hollow insulated cylindrical tube. A conductor ring surrounds the tube adjacent the location of the bellows and forms part of an oscillator circuit which may have a coil wrapped around the insulated tube for convenience. The position of the piston varies the coupling between the piston and the coil, and accordingly the capacitance of the oscillator circuit. Varying the capacitance, of course, varies its frequency of output so that the output frequency of the sensor indicates the detected altitude. The piston preferably has a non-linear taper to eliminate the need for a ROM for 100 and 10 foot increments.

According to a further aspect of the invention, a sensor comprising an aneroid bellows mounted in a metal cylinder is employed. The bellows is insulated from the cylinder and the capacitance between the bellows and the cylinder ends changes as a result of changing spacing between the bellows side and the cylinder end plates. The bellows capacitance to ground determines the frequency of a sensor oscillator connected to the bellows as discussed above.

Many other objects and purposes of the invention will be clear from the following detailed description of the drawings.

BRIEF DESCRIPTION OF THE DRAWINGS

FIGS. 8 A and B taken together show a schematic for the display circuitry.

DETAILED DESCRIPTION OF THE DRAWINGS

Figure 1:
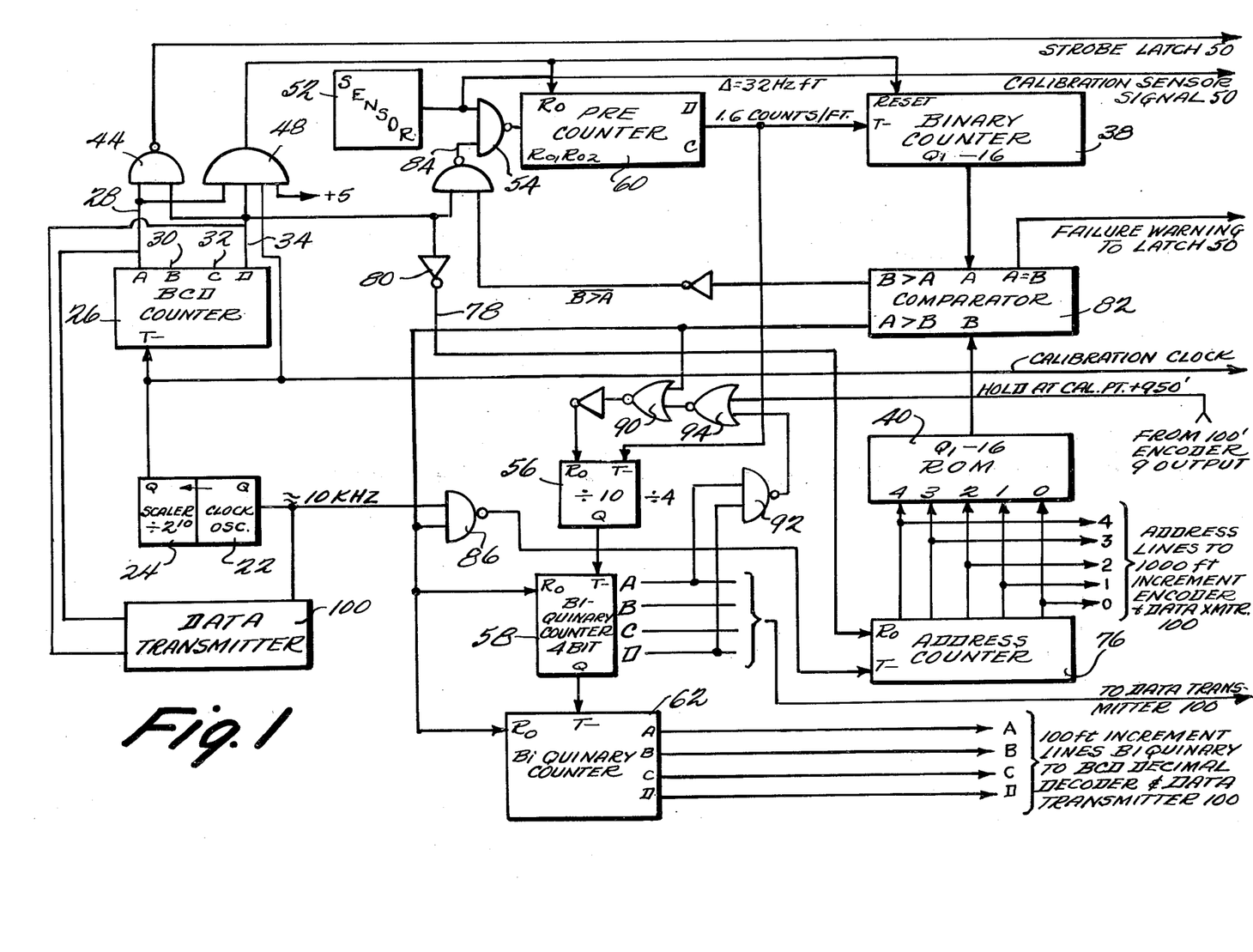
FIG. 1 shows a schematic view for a first preferred embodiment of the invention.

Reference is now made to FIG. 1 which illustrates a logic diagram for a first preferred embodiment of the invention. This particular circuit is designed to provide signals to a conventional transponder indicating the altitude of an aircraft between −1250 and 30,000 feet in one hundred foot increments. This circuit is preferably designed with integrated circuit components which are connected together to provide a reliable and accurate instrument which can be quickly and easily assembled with components of minimum expense.

A crystal controlled, clock oscillator 22 provides an output to a scaler circuit 24 which divides the frequency by a given factor for example $2^{10}$. The output of scaler circuit 24 is applied to a conventional binary coded decimal counter 26 providing ten outputs states on lines 28, 30, 32 and 34. The outputs on lines 28 and 34 are used to control the timing of the circuit and to alternately provide "count" periods in which the number of counts provided by a sensor are accumulated in binary counter 38, and "compute" periods in which the count in the binary counter 38 is compared with a number of stored, associated values in a read-only memory (ROM) 40 to provide an output to a conventional transponder indicating the altitude associated with the number stored in binary counter 38. The outputs of binary counter 26 on lines 28 and 34 are decoded by NAND gate 44 and AND gate 48. Gate 44 is connected to latch 50 in FIG. 3 for strobing the stored digital number representing altitude into the transponder. Gate 48 operates to reset counters 38 and 60 at the end of the compute period.

The output signal from a sensor oscillator circuit 52, whose frequency varies as a linear function of altitude, is applied via gate 54 to a binary count chain comprising counters 60 and 38, pre-counter 60 scaling the sensor signal so that counter 38 only contains significant bits. The output of pre-counter 60 is also applied to a second count chain comprising counters 56, 58 and 62 which are held reset until a further gating sub-period within the compute period at which time they accumulate the overshoot counts which represent additional hundreds and tens of feet above the ROM programmed calibration points.

The D output of BCD clock counter 26 on line 34 is low during eight of the ten states of the clock counter cycle, defining the "count" period in which counters 60 and 38 accumulate a binary number inversely proportional to altitude. During the above-mentioned count gating period, ROM address counter 76 is held reset to zero by a signal applied on line 78 via inverter 80. The zero address of ROM 40 holds all zeros on ROM $40\text{-}Q_1$ through $Q_{16}$; thus at the start of the compute period, the A input of comparator 82 will be greater than the B input, which is zero.

A high on line 34 signals the end of the counting period and since B>A is high, line 84 goes low disabling gate 54 and interrupting the sensor pulses entering the count chain of counters 60 and 38. The results of A = B are discussed below; At this instant, since A>B, gate 86 is enabled to supply pulses to address counter 76, which is no long held reset by the output of gate 80 incrementing it to apply successively greater binary numbers from ROM 40 outputs into the B input of comparator 82. Eventually counter 76 will address a ROM word which exceeds the count held in binary counter 38 since the counter 38 holds its count at the binary number that first produced B>A. The binary ROM 40 address numbers correspond to 1,000 foot increments of altitude and are fed to the encoder for generating the 1,000 foot transponder reply code bits.

When the B input exceeds the A input, line 84 again goes high, gating additional sensor pulses into counters 60 and 38, and excess counters 56, 58 and 62 which are no longer held reset by comparator 82. During this further gating sub-period of the compute period counters 56, 58 and 62 are not held reset since gate 90 is disabled and will accumulate numbers representing hundreds and ten of feet above the ROM programmed calibration points. During this further gating sub-period when counters 58 and 62 reach or accumulate 900 and 90 ft respectively, a reset is applied to counter 56 via gates 92, 94 and 90. This assures that the hundred foot data does not overrun before the address changes to the next 1,000 ft increment.

After the further gating sub-period, when A becomes equal to B, line 84 goes low holding the count in counter 38 equal to the number from ROM 40 at the computed address. The circuitry remains in this configuration while the transponder data latch and the data transmitter register in transmitter 100 are loaded. The data is then transmitted and stored while the counters are reset to begin a new cycle.

Figure 2:
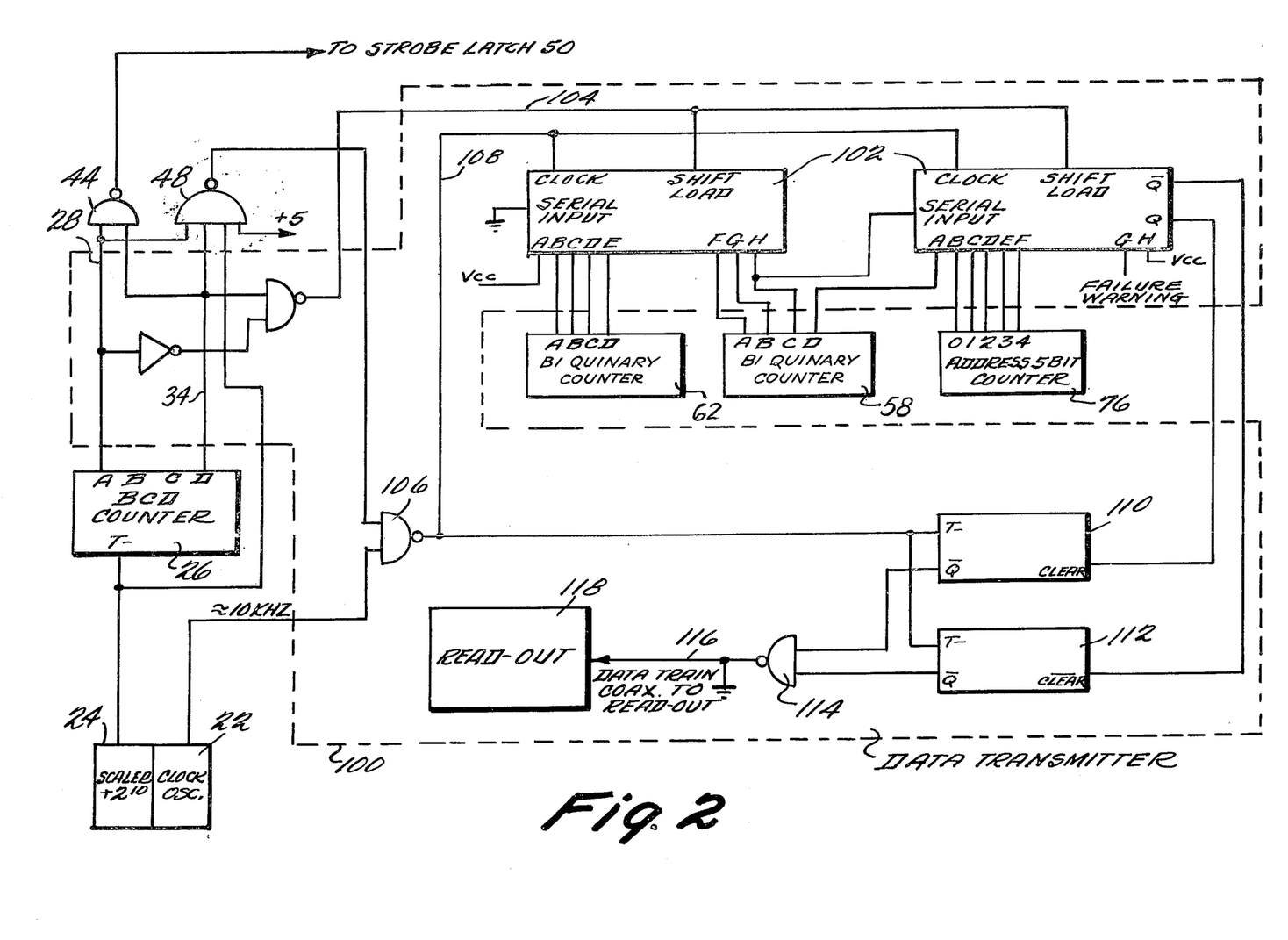
FIG. 2 shows the data transmitter.

Reference is now made to FIG. 2 which illustrates the data transmitter circuitry 100. The "compute" period just described occurs during the eight states of clock counter 26. During this period register 102 is held in LOAD by the low state applied on line 104. When clock counter 26 is triggered into the ninth state (A and D both high), line 104 goes high, disconnecting register 102 parallel inputs and enabling register 102 to be shifted by clock pulses applied from clock 22 via gate 106 and line 108. Gate 106 is enabled during the second half of the ninth count of counter 26 by the high pulse from gate 48. Upon the high signal from gate 48, the first transition on line 108 is negative, causing multivibrators 110 and 112 to be triggered. However, one will be held in clear by the output of register 102 and the 12 $\mu$s multivibrator 110 or 3 $\mu$s multivibrator 112 will fire if a 1 or 0, respectively, is applied by register 102. Whichever multivibrator 110 or 112 fires, delivers a pulse through NAND gate 114 to line 116 to the readout device. Line 108 then goes high, shifting the register information one position until a negative transition on line 104 fires multivibrator 110 or 112 again. This cycle is repeated, shifting all of the data out of register 102 and converting it into a train of long or short binary pulses. The first and last parallel inputs of the register 102 are tied high to provide framing pulses for the data receiver.

As the data is being shifted to the conventional readout device 118 during the count period, the pulse from gate 48 resets the binary counters 38 and 60 to prepare for the next cycle.

Figure 3:
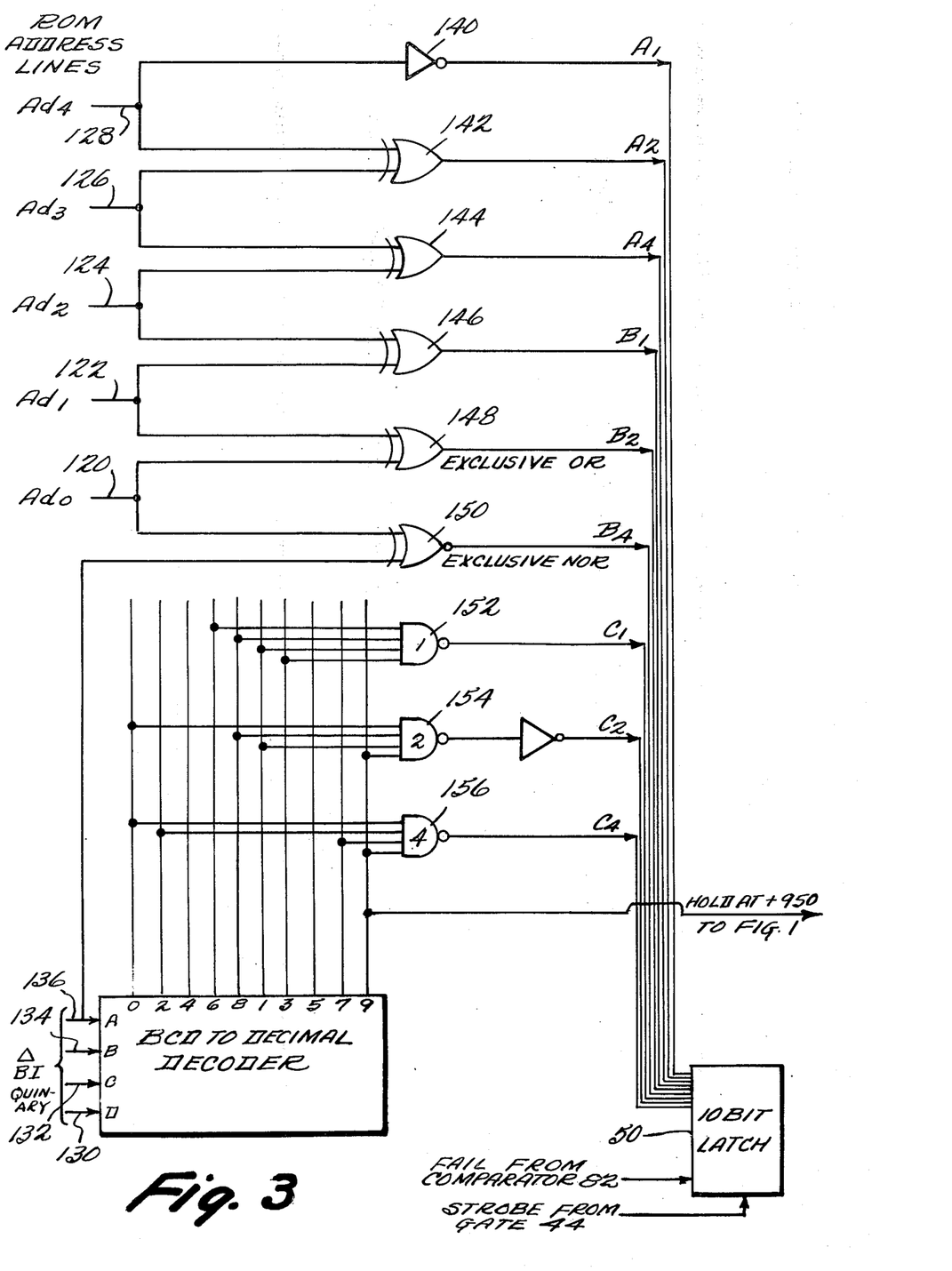
FIG. 3 shows the reply generator circuit for the embodiment of FIG. 1.

FIG. 3 illustrates the reply generator circuit which receives the outputs of address counter 76 on lines 120, 122, 124, 126 and 128 and biquinary counter 58 on lines 130, 132, 134 and 136 with gates 140, 142, 144, 146, 148, 150, 152, 154 and 156 decoding the signals and providing digital inputs to a 10-bit latch 50 which also receives the strobe input from gate 44 and the failure input from comparator 82 indicating malfunction.

Figure 4:
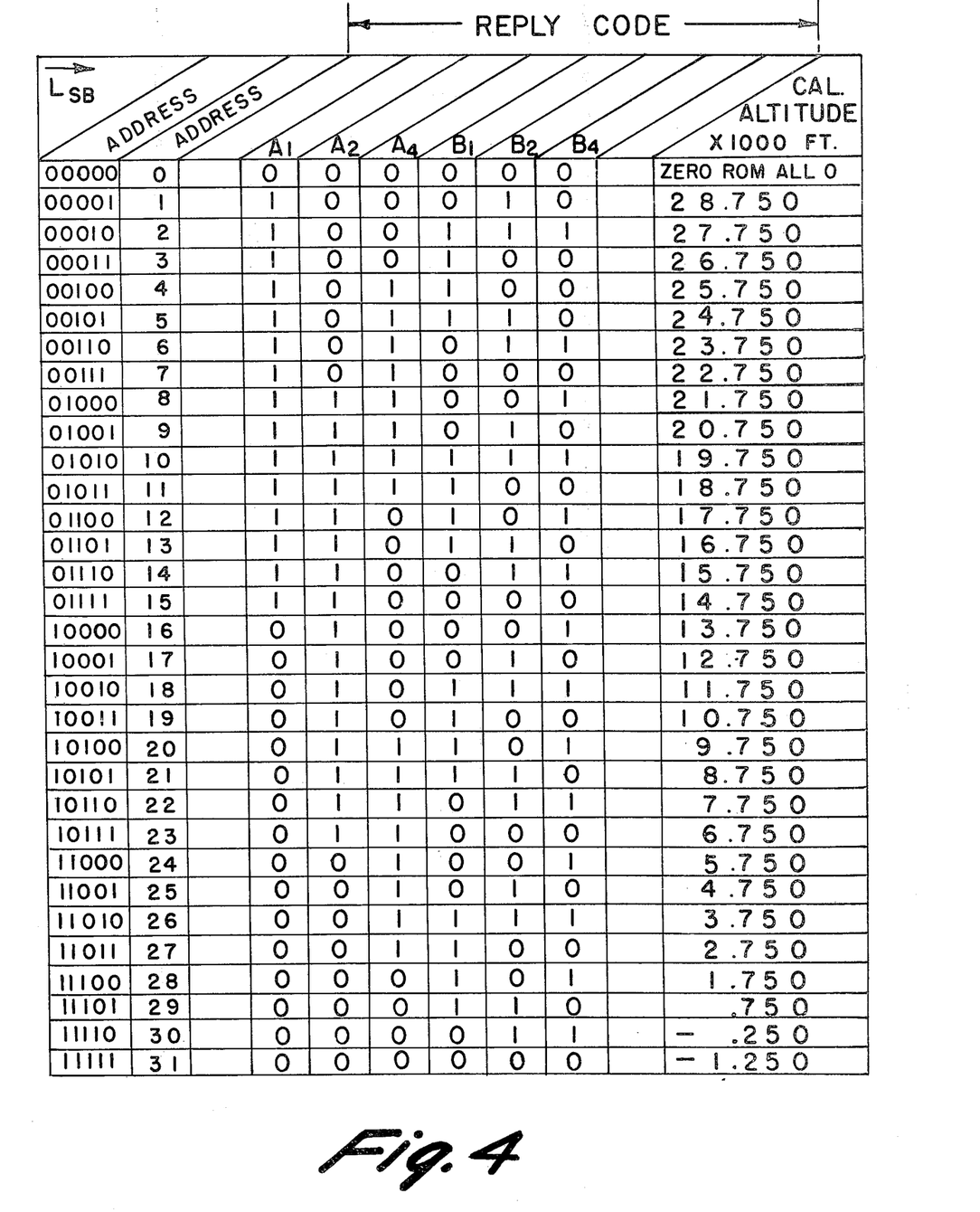
FIG. 4 shows a chart illustrating the reply code for the embodiment of FIG. 1.
Figure 5:
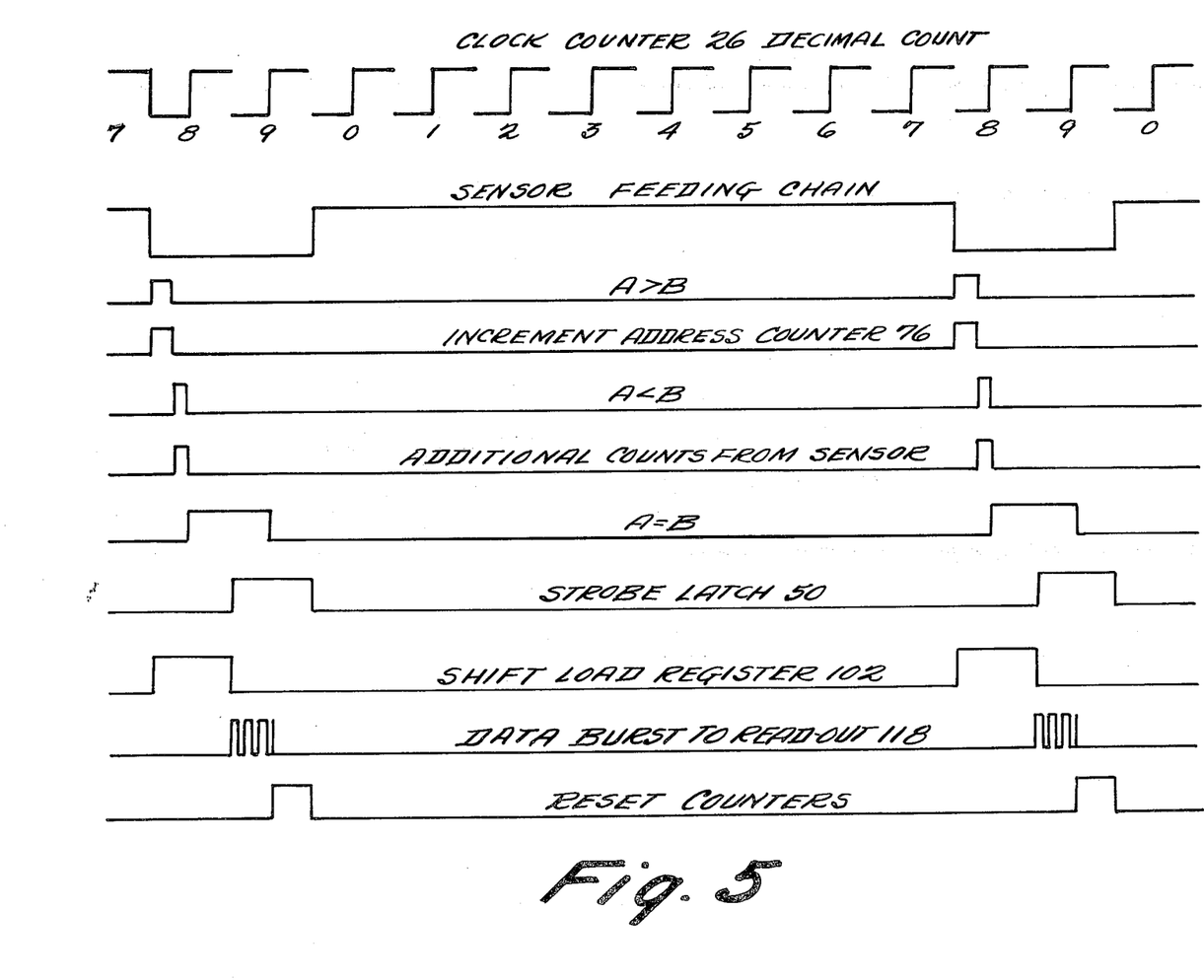
FIG. 5 shows a chart of the sequence of operations.

FIG. 4 illustrates the reply code and the various addresses for the arrangement of FIGS. 1 and 3 while FIG. 5 illustrates the operations sequences with all transitions illustrated by positive pulses.

Figure 6:
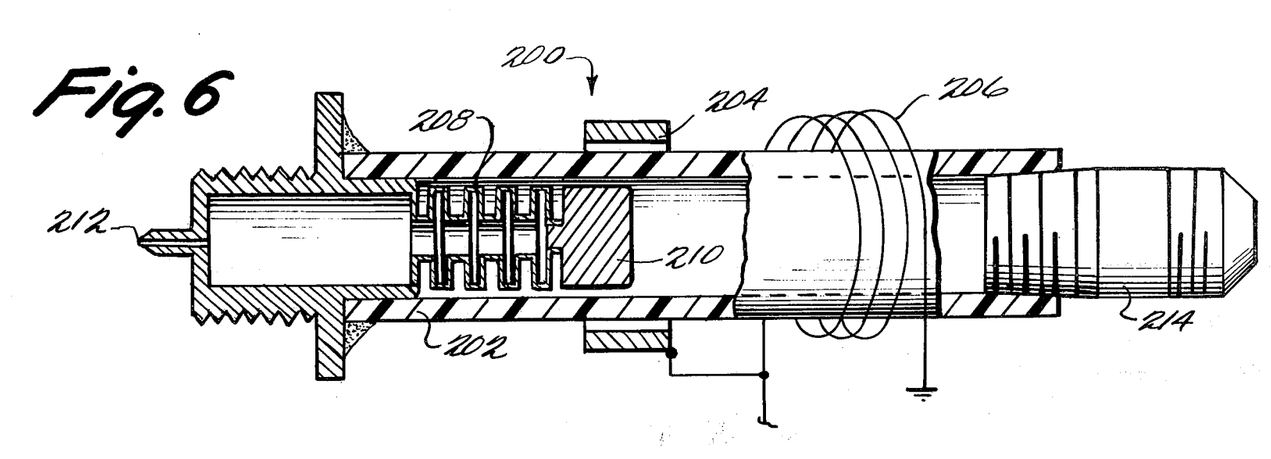
FIG. 6 shows a partially cut-away view of one sensor.

FIG. 6 illustrates one particular altimeter sensor configuration which has been found to be particularly effective in conjunction with the arrangement of FIGS. 1–3. Sensor 200 in FIG. 6 is comprised of an insulated sleeve 202 about which is disposed a copper or other metallic ring 204 which is connected in an oscillator circuit including a coil 206 which is preferably, but not necessarily, wound about insulator tube 202. A hollow, evacuated bellows 208 of metal or the like extends into one end of insulator tube 202 and terminates in a piston 210 which moves within tube 202 as a function of exterior air pressure and the position of which accordingly reflects the altitude of the aircraft as well as the barometric pressure. Bellows 208 is coupled by epoxy or the like to the end of the tube and includes an evacuation stem 212 by which the air is removed. At the other end of the tubing, a conventional static fitting 214 is provided for mounting the sensor in conjunction with the remainder of the circuitry as desired. The capacitive coupling between piston 210 and copper ring 204 determines the capacitance of the oscillator circuit which in turn determines the frequency of the signals which it applies to counter 60 in the embodiment of FIG. 1. Preferably piston 210 is tapered non-linearly to eliminate the need for a ROM to program the 100 foot increment counter.

Figure 7:
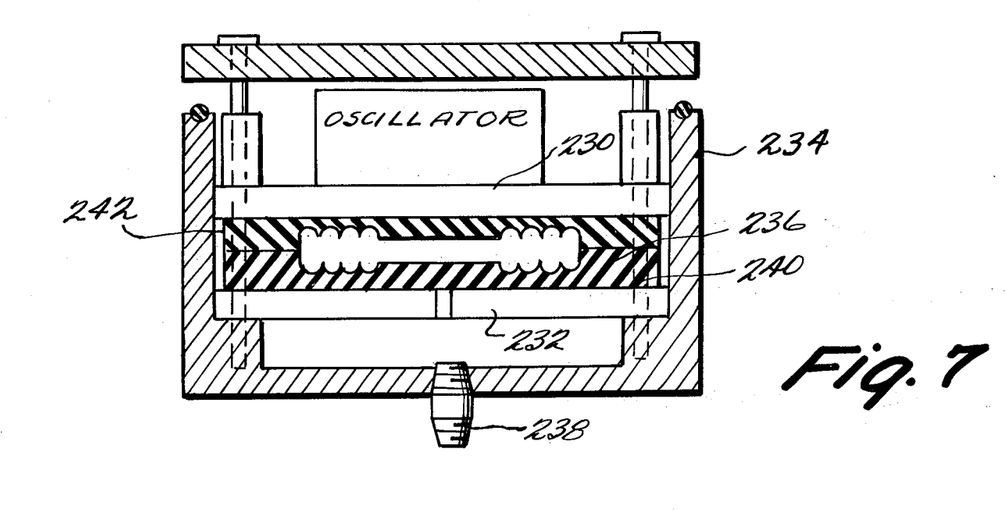
FIG. 7 shows a partially cut-away view of another sensor.

Reference is now made to FIG. 7 which illustrates a further sensor which can be used with this particular type of embodiment. In this sensor, the capacitance between the diaphragm capsule 234 and a grounded pair of metal discs 230 and 323 is varied in accordance with the atmospheric pressure to vary the frequency of output of an oscillator circuit of which the capacitance between discs 230 and 232 froms part of the tank circuit. Grounded discs 230 and 232 are mounted adjacent to but not touching ends of an android bellows 236 which is insulated from ground and connected to the oscillator which forms clock 22 and is coupled to the atmosphere by a pressure fitting 238. Insulating rings 240 and 242 separate the metal discs and support diaphragm capsule 234 between them. The oscillator circuit is preferably lodged in the space indicated above disc 230.

Figure 8A:
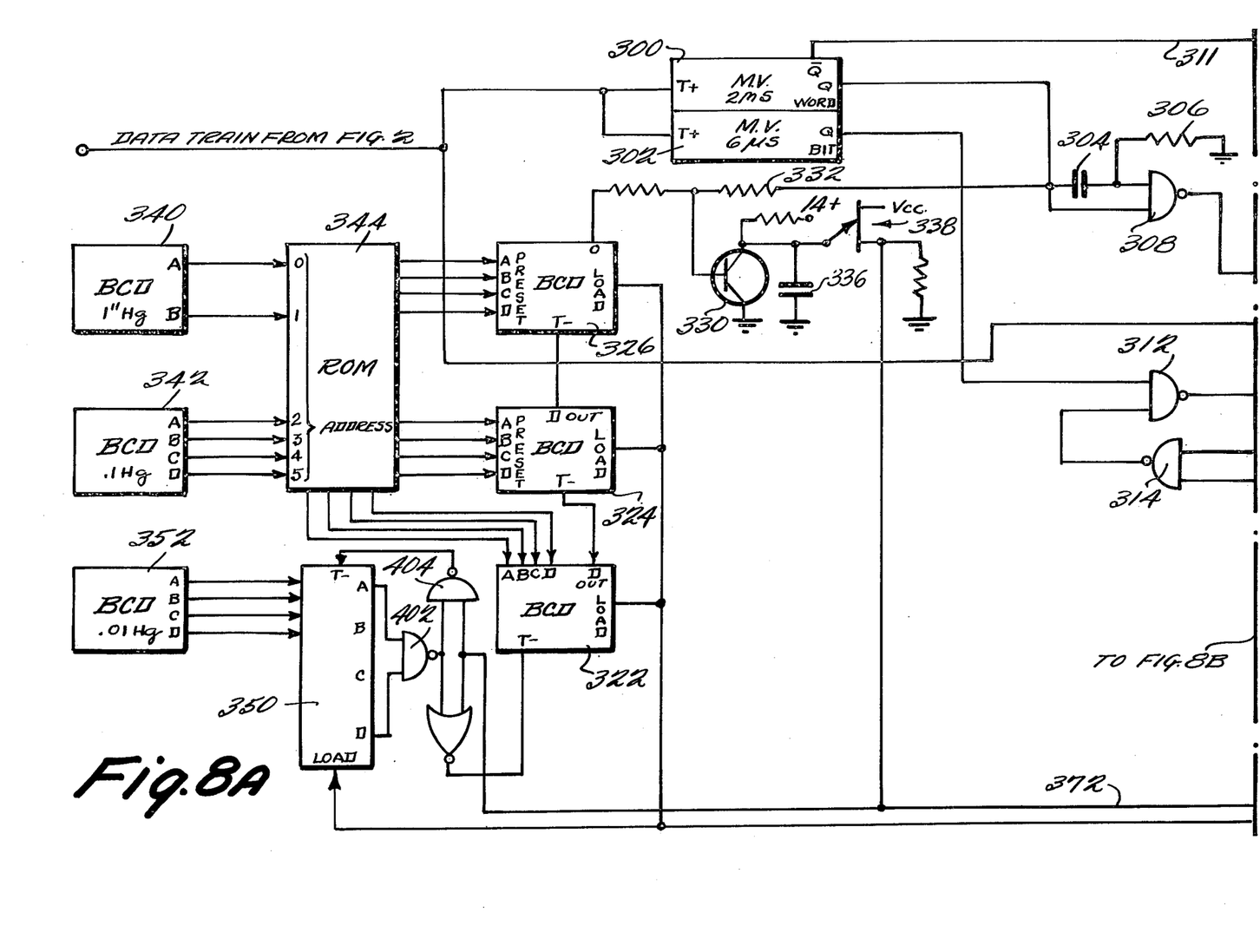
Figure 8B:
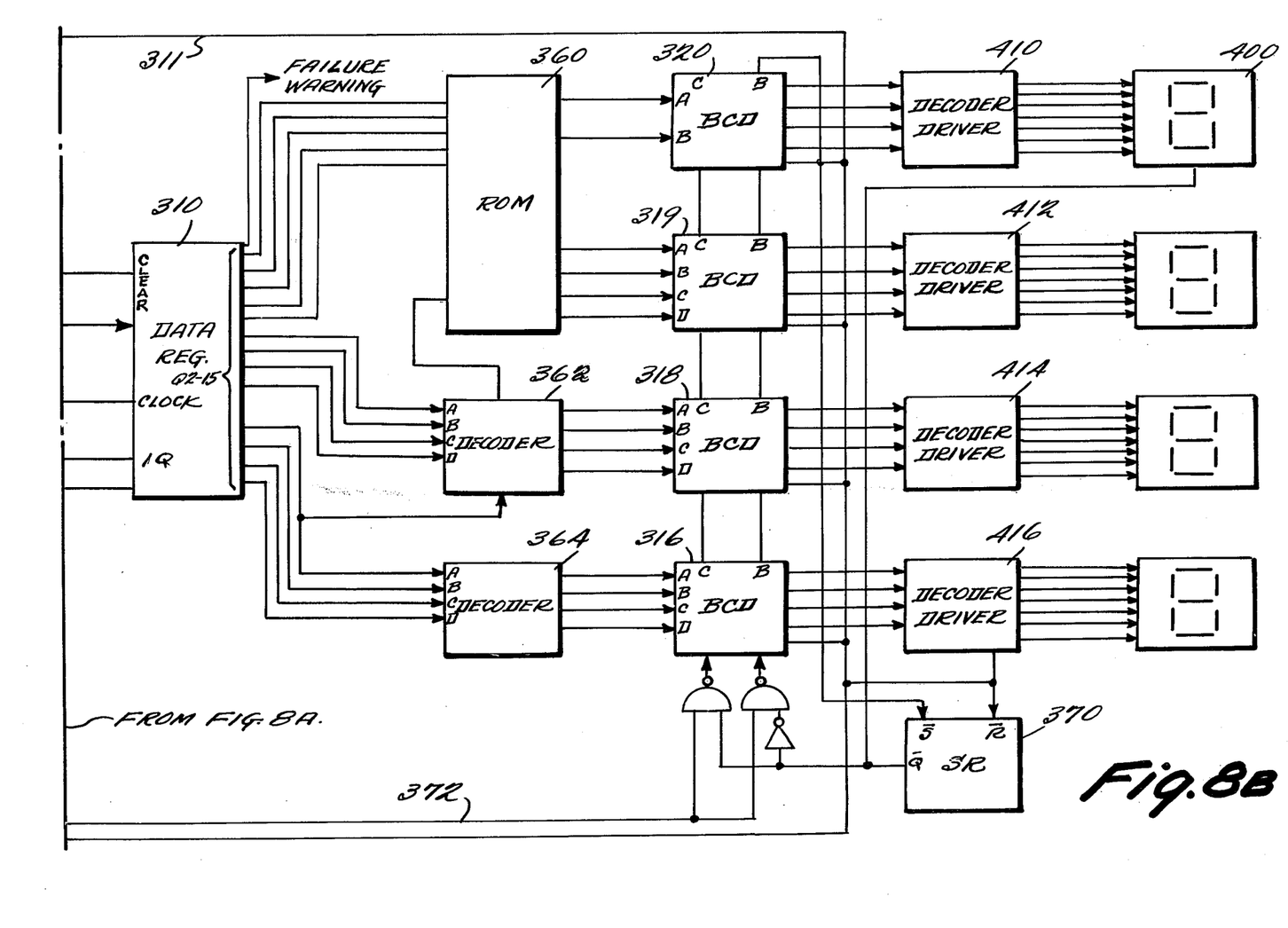

Reference is now made to FIG. 8 which illustrates display in which correction is made for barometric pressure. As discussed above, such correction is not normally required for the transponder, since the computer on the ground is programmed to take into account the barometric pressure at the location of the aircraft. However, for providing an aircraft display or for more sophisticated equipment, barometric correction may be desirable.

In FIG. 8 the computed altitude, referenced to 29.92 inches of mercury, is received from the data transmitter in FIG. 2 as a serial train of short and long pulses representing 0 and 1 respectively. As indicated above, the first and last pulses in this data train are always long, representing a one entry. The rising edge of the first pulse in the data train triggers multivibrators 300 and 302. Once triggered, multivibrator 300 produced a pulse which lasts longer than the full data train. The leading edge of the pulse from multivibrator 300 is differentiated by capacitor 304 and resistor 306 and applied through gate 308 to reset data register 310 before receiving new data.

While only the first pulse in the train triggers multivibrator 300, multivibrator 302 is triggered on the leading edge of every arriving data pulse. Multivibrator 302 has a period of 6 µs, at the end of which the Q output of multivibrator 302 goes to deliver via gate 312 a positive going pulse to shift the information in register 310 one position. Since the shifting of the register occurs 6 µs after the leading edge of each data pulse, and the data train is applied to the serial input of register, if a long (12 µs) pulse is entering, the register serial input will be high when the register is shifted. Thus a one enters register 310. If a short (3 µs) pulse enters, the register serial input will be low when the register is shifted causing a 0 to be entered.

This shifting in of data continues until the first and last parallel outputs of the data register become high indicating that the data word is properly framed in the register. With the first and last register bits high, gate 314 disables gate 312 and prevents register 310 from shifting again until a new data train is received. Thus the data becomes stored in register 310 while the Q output of multivibrator 300 is high. Since multivibrator 300 is triggered when new data arrives, the resulting shift of the Q low on line 311 effectively dumps the previously displayed information output by placing altitude counters 316, 318, 319 and 320 and barometer counters 322, 324 and 326 in the LOAD condition, while blanking the readout display. During the Q high pulse of multivibrator 300 the base of transistor 330 is forward biased by Q output of multivibrator 300 via register 332, holding transistor 330 conductive and thus preventing voltage buildup on capacitor 336 from activating unijunction transistor 338. While multivibrator 300 produces a high output on Q, coded binary preset information is applied from the barometric setting selector switches 340 and 342 through ROM 344 to counters 322, 234 and 326 and to counter 350 directly from switch 352. While the Q output of multibibrator 300 is low, binary coded decimal information is applied to ROM 360 and decoders 362 and 364 to derive a corresponding number 2,000 feet greater and loaded into BCD counters 316, 318, 319 and 320.

The pulse from multivibrator 300 also places setreset flip flop 370 in the reset (Q low) condition. Thus when the Q output of multivibrator 300 returns low the altitude counters 316, 318, 319 and 320 are holding BCD information 2,000 feet greater than the actual altitude. This insures that counters 326, 324, 322 and 320 never need to be loaded with a negative number. The number in counters 316, 318, 319 and 320 is now decremented ten feet on the trailing edge of each pulse on line 372. If the pulses from transistor 338 on line 372 decrement counters 316, 318, 319 and 320 through zero, then the "borrow" signal from counter 320 sets flip-flop 370 causing the remaining counts to clock up ten feet with every pulse. When flip-flop 370 output Q is high, the minus sign on the 10 K feet seven segment readout 400 is illuminated indicating that the corrected altitude is below sea level.

Barometer counters 322, 324 and 326 are loaded while output Q of multivibrator 300 is with a BCD number less than 400 and counter 350 is loaded with the 0.01 inch Hg barometric preset. Next the Q of multivibrator 300 goes low disconnecting the preset information from counters 316, 318, 319, 320, 322, 324 and 326 and removing the clamp drive from the base of enabling unijunction transister 338 to produce decrementing pulses. Since the altitude information was loaded 2,000 feet higher than actual, then if 200 ten feet decrement pulses are applied on line 732, the counters 316, 318, 319 and 320 will come to rest on the true zero correction altitude.

The decrementing will continue as unijunction transister 330 delivers pulses to counters 350, 322, 324 and 326 and altitude counters 316, 318, 319 and 320 until the C output of counter 326 goes high representing 400 barometric decrement pulses. With the C output or counter 326 high, transister 330 is again forward biased, terminating the barometric correction pulse burst. Thus the difference between the barometric counters 316, 318, 319 and 320 presets and 400 is the number of ten foot decrements applied. When unijunction transister 338 begins to deliver pulses, if counter 350 was preset with a number less than nine, then gate 402 through gate 404 enables counter 350 to accumulate pulses up to count 9 at which time the output of 402 goes low disabling counter 350 and enabling counters 322, 324 and 326, which will count up to the BCD number representing 400 and hold there.

The end result of the above sequence leaves counters 316, 318, 320 and 322 holding BCD numbers representing the true barometric corrected altitude to drive the readout decoder drivers 416, 412, 414 and 416 and, if flip-flop 370 is set, to display negative altitude. These BCD altitude numbers will remain in counters 316, 318, 319 and 320 driving the display until a new data train is received to fire multivibrator 300 again.

Many changes and modifications in the abovedescribed embodiments of the invention can, of course, be carried out without departing from the scope thereof. Accordingly that scope is intended to be limited only by the scope of the appended claims.

What is claimed is:

1. An electrical circuit for providing a digital output signal to an aircraft transponder comprising:
    means for producing a pulse train having a frequency which varies as a function of altitude,
    gating means for producing a signal defining a first gating period in which pulses from said producing means are counted and a second gating period in which counted pulses are employed to generate said digital output signal,
    counter means connected to said gating means and to said producing means for receiving and accumulating a count of pulses from said producing means during said first gating period,
    a read only memory having a plurality of output states each indicative of a count and corresponding to an address which is associated with a given number of first foot increments of altitude,
    comparator means connected to said read only memory and to said counter means for providing a first output when the count in said said counter means exceeds an applied output state of said read only memory and a second output when the count in said counter is equal to or less than the applied output state of said read only memory,
    addressing means connected to said gating means and said read only memory for successively applying different addresses to said read only memory, during said second gating period, to cause said read only memory to apply successive output states associated with increasing numbers of first increments to said read only memory, and
    output gate means connected to said addressing means for producing a digital signal from the address applied to said read-only memory after said comparator means shifts to said second output state.

2. A circuit as in claim 1 further including second counter means connected to said producing means and to said comparator means for receiving and accumulating a count during said compute period indicating a number of second increments of altitude, each less than said first increment, and logic means connected to said comparator means and said counter means for causing said second counter to accumulate counts during said second gating period while said comparator means provides said second output and wherein said first counter means includes means for applying pulses from said producing means to said first counter means during said second gating period and while said comparator means is providing said second output state.

3. A circuit as in claim 1 wherein said gating means includes a clock oscillator, a binary counter connected to said oscillator, and means for decoding the output states of said binary counter.

4. A circuit as in claim 3 wherein said counter means includes a pre-counter, logic gate means connected to said pre-counter, to said comparator circuit and to said decoding means for disabling said pre-counter during said second gating period while said comparator circuit is providing said first output, a further binary counter and means for connecting said further binary counter to the output of said pre-counter.

5. A circuit as in claim 1 wherein said first increment is 1,000 feet.

6. Apparatus as in claim 1 further including means for receiving an input indicating barometric pressure and means connected to said barometric indicating means and said counter means for providing an output of altitude corrected for barometric pressure.

7. Apparatus as in claim 6 wherein said output providing means includes means for producing a visual display.

8. Apparatus as in claim 6 further including means connected to said display for accumulating a count of pulses indicating altitude uncorrrected for barometric pressure, means for accumulating a count of pulses indicating the deviation of barometric pressure from standard pressure, means for indicating the direction of deviation, and means for incrementing or decrementing the count in said counter means as a function of the detected direction of deviation by a number which indicates said deviation.

9. Apparatus as in claim 8 wherein said counter means includes first and second binary counters.

10. A circuit as in claim 1 wherein said pulse producing means includes
    a hollow cylindrical member,
    a metal ring disposed about a portion of said cylindrical member,
    a bellows mounted in said member and having a piston movable within said member as a function of pressure to vary the capacitance between said piston and said ring, and
    a coil coupled to said capacitance to form a tank circuit for an oscillator.

11. A circuit as in claim 1 wherein said pulse producing means includes
    a hollow cylindrical member,
    a pair of metal discs disposed within said cylindrical member,
    a bellows mounted in said member between said discs so that the bellows to disc separation varies as a function of pressure to vary the capacitance between said discs, and a coil coupled to said capacitance to form a tank circuit for an oscillator.

12. A circuit as in claim 11 wherein said discs are coaxial with said member.

13. A circuit as in claim 6 wherein said providing means includes register means connected to said read only memory and said second counter means for storing a count indicating altitude uncorrected for barometric pressure, further counter means, means for applying to said further counter means a signal which varies as a function of the count stored in said register means, manual means for entering a number representing the actual barometric pressure, means connected to said manual means for converting the entered number into increments of altitude, means for incrementing or decrementing the count in said further counter means as a function of said increments of altitude to produce a count indicative of altitude corrected for barometric pressure, visual display means connected to said further counter means for providing a display of altitude.

* * * * *

UNITED STATES PATENT OFFICE
CERTIFICATE OF CORRECTION

Patent No. 3,889,104           Dated June 10, 1975

Inventor(s) Philip L. Smith

Figure 5B:
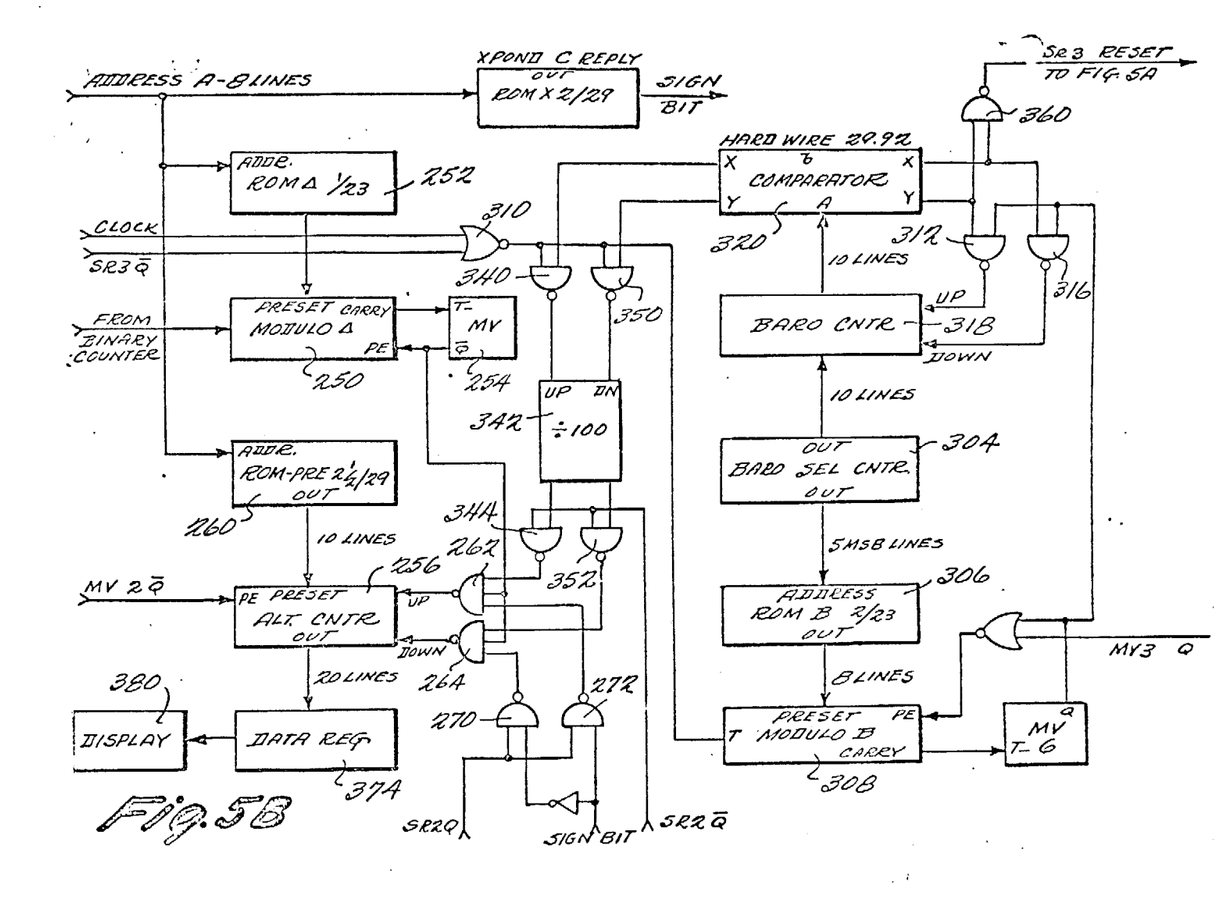

It is certified that error appears in the above-identified patent and that said Letters Patent are hereby corrected as shown below:

In the drawings, Figure 5B as shown on the attached sheet should be added.

Signed and Sealed this fourteenth Day of October 1975

[SEAL]

Attest:

RUTH C. MASON
*Attesting Officer*

C. MARSHALL DANN
*Commissioner of Patents and Trademarks*

Fig. 5B